United States Patent
Picard et al.

(10) Patent No.: US 6,233,318 B1
(45) Date of Patent: *May 15, 2001

(54) SYSTEM FOR ACCESSING MULTIMEDIA MAILBOXES AND MESSAGES OVER THE INTERNET AND VIA TELEPHONE

(75) Inventors: Donald F. Picard, Medford; Thomas Lyman Root, Andover; Jeffrey John Schlueter, Wakefield; Gerald William Weare, Sherborn, all of MA (US)

(73) Assignee: Comverse Network Systems, Inc., Wakefield, MA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/743,793

(22) Filed: Nov. 5, 1996

(51) Int. Cl.$^7$ ................................................. H04M 3/533
(52) U.S. Cl. .................................. 379/88.17; 379/88.12; 379/88.13; 379/88.25
(58) Field of Search .................... 395/200.34, 200.48, 395/200.49; 379/67, 88, 89, 93.17, 93.24, 93.25, 67.1, 88.13, 88.14, 88.17, 88.18, 88.12, 88.25; 348/15; 709/204, 218, 219, 206, 207, 227, 228

(56) References Cited

U.S. PATENT DOCUMENTS

| | | | |
|---|---|---|---|
| 4,612,416 | 9/1986 | Emerson et al. | 179/6.11 |
| 4,646,346 | 2/1987 | Emerson et al. | 379/214 |
| 4,837,798 | 6/1989 | Cohen et al. | 379/88 |
| 5,008,926 | 4/1991 | Misholi | 379/89 |
| 5,029,199 | 7/1991 | Jones et al. | 379/89 |
| 5,193,110 | 3/1993 | Jones et al. | 379/88 |
| 5,260,990 | 11/1993 | MeLampy et al. | 379/67 |

(List continued on next page.)

FOREIGN PATENT DOCUMENTS

| | | |
|---|---|---|
| 0662763A2 | 7/1995 | (EP) . |
| 96/34341 | 10/1996 | (WO) . |
| 97/40612 | 10/1997 | (WO) . |

OTHER PUBLICATIONS

Shung–Foo Yu et al., "A Multimedia Gateway For Phone/Fax and MIME Mail", Computer Communications 20, 1997, pp. 615–627.

(List continued on next page.)

*Primary Examiner*—Krista Zele
*Assistant Examiner*—Roland G. Foster
(74) *Attorney, Agent, or Firm*—Staas & Halsey LLP

(57) ABSTRACT

A unified messaging system that provides a multimedia mailbox. The system allows a subscriber to access stored multimedia messages, such as voicemail messages, facsimile messages, combined voice and facsimile messages and video messages, not only through a public switched telephone network using a telephone but also over a data network, such as the Internet or an intranet, using a personal computer. The system provides voicemail access over the telephone network, indicating message number, etc. with the ability to play messages to the telephone user as desired. For text type messages, such as facsimile and e-mail, the system converts the text into speech and plays the speech to the telephone user. The system allows a personal computer user to obtain the data network access using an Internet browser. The browser is used to access a home page of the system and get information about the messages stored, and is used to download (get) and play the messages at the personal computer via data streaming in the case of a voice or video messages or view the messages in the case of text type messages, such as facsimile and e-mail. The user can also perform the other typical messaging functions over the data network connection that are provided for telephone access, such as viewing a message list, saving and deleting messages, group list administration and other administration tasks.

2 Claims, 11 Drawing Sheets

U.S. PATENT DOCUMENTS

| | | | |
|---|---|---|---|
| 5,263,080 | | 11/1993 | Jones et al. ............................ 379/88 |
| 5,406,557 | * | 4/1995 | Baudoin ................................ 379/88 |
| 5,475,748 | | 12/1995 | Jones .................................... 379/211 |
| 5,479,411 | * | 12/1995 | Klein ..................................... 379/88 |
| 5,493,607 | | 2/1996 | Arumainayagam et al. .......... 379/88 |
| 5,519,766 | | 5/1996 | Jones .................................... 379/74 |
| 5,524,137 | | 6/1996 | Rhee ..................................... 379/67 |
| 5,524,139 | | 6/1996 | Jones .................................... 379/67 |
| 5,526,353 | | 6/1996 | Henley et al. ........................ 375/241 |
| 5,530,740 | | 6/1996 | Irribarren et al. .................... 379/89 |
| 5,537,461 | | 7/1996 | Bridges et al. ....................... 379/88 |
| 5,557,659 | | 9/1996 | Hyde-Thomson .................... 379/88 |
| 5,568,540 | | 10/1996 | Greco et al. .......................... 379/89 |
| 5,604,803 | * | 2/1997 | Aziz ..................................... 380/25 |
| 5,608,786 | * | 3/1997 | Gordon ................................. 379/100 |
| 5,625,775 | * | 4/1997 | Davis et al. .................. 395/200.12 |
| 5,630,060 | * | 5/1997 | Tang et al. ................... 395/200.01 |
| 5,647,002 | * | 7/1997 | Brunson ............................... 379/88 |
| 5,675,507 | * | 10/1997 | Bobo, II ............................... 358/400 |
| 5,737,395 | * | 4/1998 | Irribarren ............................. 379/88 |
| 5,740,231 | * | 4/1998 | Cohn et al. ........................... 379/89 |
| 5,751,338 | * | 5/1998 | Ludwig, Jr. .......................... 379/202 |
| 5,760,823 | * | 6/1998 | Brunson et al. ...................... 348/14 |
| 5,764,731 | * | 6/1998 | Lubachevsky ....................... 379/67 |
| 5,799,063 | * | 8/1998 | Krane ................................... 379/88.17 |
| 5,802,314 | * | 9/1998 | Tullis et al. .......................... 709/246 |
| 5,931,917 | * | 8/1999 | Nguyen et al. ...................... 709/250 |

OTHER PUBLICATIONS

"Requirements For Integrated Messaging Desktop", dated Mar., 1995, 9 pgs.

"Lotus cc:Mail For The World Wide Web, Release 1.0", dated Oct. 1995, 3 pgs.

REPARTEE® Version 7.1, "Telanophy Feature Package Guide", First Edition 1994.

"AccessWEB™ Internet Messaging Application", Boston Technology, 1996.

"Integrated Mailbox Approach", Boston Technology, Inc., Nov. 8, 1995, G. Weare and J. Schlueter.

"Unified Messaging System—Market forces driving the development of unified messaging", Boston Technology, Jul. 1996.

VocalTec Press Release—"Vocaltec Introduces Internet Voice Mail 3.0 Integrated Voice Messaging For Electronic Mail", Jan. 31, 1997.

* cited by examiner

Send a Voice Message

FileName: ☐

TO:
☐

CC:
☐

BCC:
☐

☐ Urgent ☐ RRR ☐ Private ☐ Personal

| SUBMIT MESSAGE | CLEAR MESSAGE |

Figure 11

SYSTEM FOR ACCESSING MULTIMEDIA MAILBOXES AND MESSAGES OVER THE INTERNET AND VIA TELEPHONE

REFERENCE TO MICROFICHE APPENDIX

A microfiche appendix having 5 microfiche and 490 frames is included herewith that includes source code in the $C^{++}$/HTML languages.

BACKGROUND OF THE INVENTION

1. Field of the Invention

The present invention is directed to a system for accessing stored messages over a network and, more particularly, is directed to a system for providing unified access to stored messages, such as multimedia mail messages, in a unified multimedia mailbox through multiple access pathways such as over a telephone network using a telephone and over the Internet using a browser.

2. Description of the Related Art

Communication systems currently exist that allow different types of messages, such as voice mail messages and facsimile messages, to be stored for later retrieval by a subscriber to such systems. These types of systems are described in U.S. Pat. Nos. 5,029,199; 5,193,110; 5,260,990; 5,263,080; 5,475,748; 5,493,607; 5,524,139; 5,519,766 and 5,008,926, all incorporated by reference herein. These systems allow a caller or sender to leave a message, such as a voice mail message, for a subscriber whenever the subscriber is not available. When a voice mail message is to be retrieved the subscriber typically connects with the system over a conventional telephone line via a telephone call and plays the message by using the touchtones produced by the telephone to control playback, as well as other functions. In these systems the access by the subscriber is typically only through a telephone line connection. Today, there is a need to allow access to such systems through other means such as the Internet or Intranet.

Several different types of messaging systems, such as voice mail and e-mail, are also available to users. Users of the variety of today's messaging systems typically have to use several different systems and/or terminals to get their messages. A typical business user may have several voice mailboxes, several e-mail mailboxes, and perhaps some mailbox-like facsimile services. Each of these mailboxes requires separate operations and different types of terminals (DTMF telephone for voice mail, personal computer (PC) for e-mail access, facsimile machine/PC for facsimile messages). The mailboxes have different names (addresses) and cannot usually interwork. Notification mechanisms are either non-existent, or tied to one of the mailboxes. What is needed is a mailbox system that integrates all of these message types and access methods.

SUMMARY OF THE INVENTION

It is an object of the present invention to provide a system that allows a subscriber to access stored messages over not only a telephone network but also over a network such as the Internet or an intranet.

It is an additional object of the present invention to provide a system that unifies message storage allowing different types of messages or electronic communications such as voicemail, facsimile, e-mail and video mail to be stored on a single system in a single unified multimedia mailbox, and accessed via different pathways, such as via a telephone network or the Internet/Intranet.

It is an object of the present invention to provide a system that will allow multimedia messaging via a multimedia mail box.

It is another object of the present invention to provide a system that is easy to use and which uses access tools that are familiar to telephone and Internet users.

It is a further object of the present invention to provide a simple visual interface to a message storage system that simplifies the tasks associated with message access and administration.

It is also an object of the present invention to provide a platform that allows services for a variety of message types such as voice mail, video mail and facsimile mail, as well as other network services such as Internet and intranet services.

It is another object of the present invention to provide a system architecture that is easily scaleable, has a high availability and which provides a fast response.

It is an object of the present invention to provide a standards based system that will support mailbox access to a multimedia mailbox using conventional web browser software.

It is another object of the present invention to provide a system in which the message service provider does not need to supply the user with any client application software.

It is a further object of the present invention to provide message waiting/urgent notifiers when new or urgent messages are deposited in the mailbox or the message status changes by a simultaneous different connection into the mailbox such as when a mailbox is accessed by computer and while the computer is logged into the mailbox an access via a telephone interface deletes a message.

The above objects can be attained by a system that allows a subscriber to access stored messages, such as voicemail messages, facsimile messages, e-mail messages and video messages, that are stored in a unified multimedia mailbox not only through a public switched telephone network using a telephone but also over a data network, such as the Internet or an intranet. The system provides voicemail access over the telephone network, indicating message number, etc. with the ability to play messages to the telephone user. For text type messages, such as facsimile and e-mail, the system converts the text into speech and plays the speech to the telephone user. The system allows a personal computer user to obtain the data network access using an Internet browser. The browser is used to access information about the messages stored and is used to download and play the messages via data streaming in the case of a voice or video messages or view the messages in the case of text type messages, such as facsimile and e-mail. The user can also perform the other typical messaging functions over the data network connection that are provided for telephone access, such as saving and deleting messages, group list administration and other administration tasks.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 11 depicts a message retrieval template.

DESCRIPTION OF THE PREFERRED EMBODIMENTS

Figure 1:
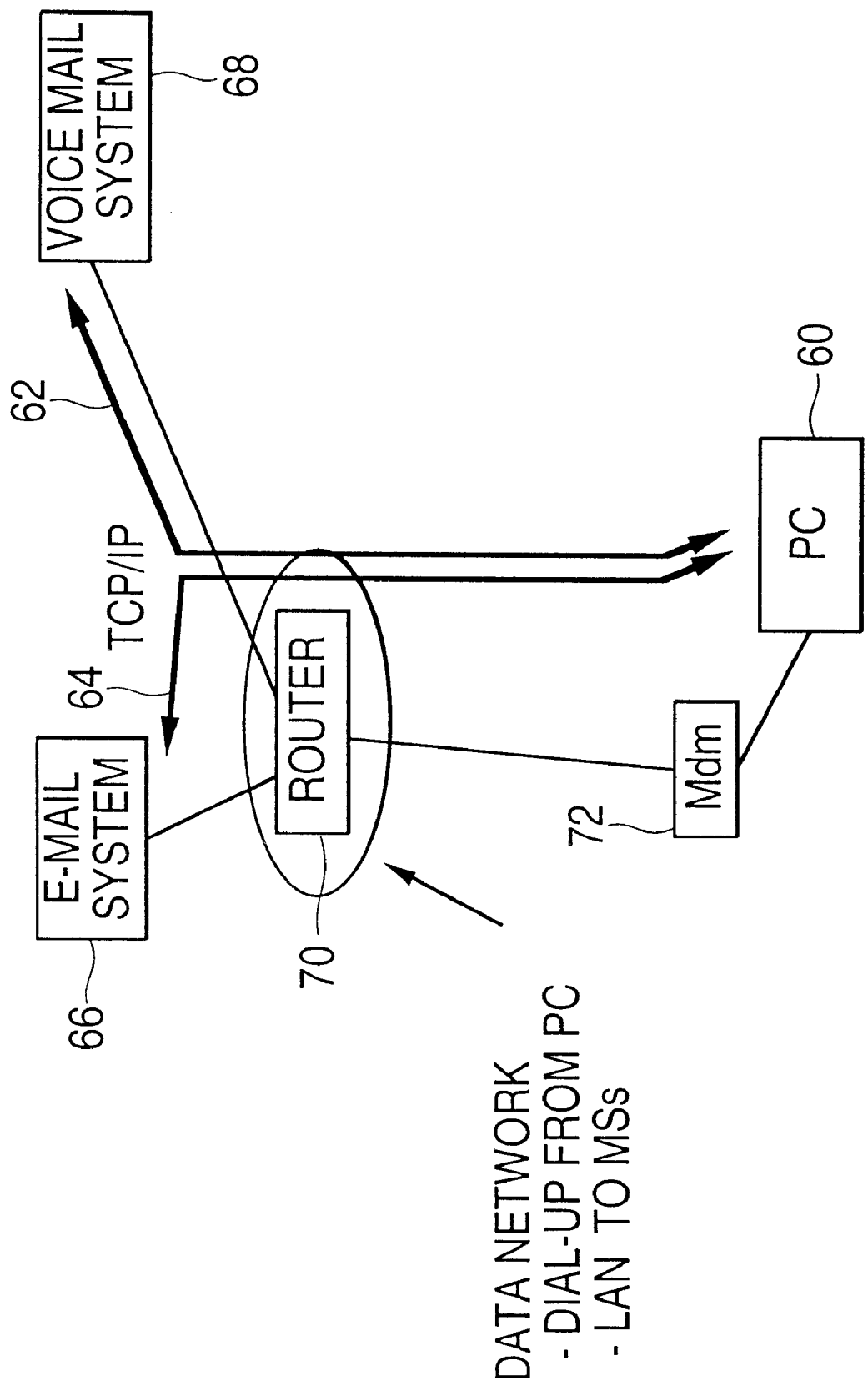
FIG. 1 illustrates a virtual unified system unified by the actions of a personal computer 60.

The present invention provides an integrated multimedia mailbox and unified messaging. The term "mailbox" is used to mean an entity visible to the subscriber. This is the entity the subscriber logs into and appears to operate on when the subscriber performs mail-related operations. This subscriber-visible entity may not correspond directly with a single implementation entity, but may exist only through the cooperation of several distinct messaging systems, each with its own message storage capability. To avoid confusion, the term "mailbox" is used to mean only the subscriber visible entity, and, where necessary, the term "message endpoint" is used to denote the implementation entity or entities which underlie the integrated mailbox.

Integrated mailboxes have certain desirable and preferable characteristics. A fully integrated mailbox, in accordance with the present invention, includes the following major capabilities that are not present in a single-media mailbox:

a. The ability to deal with messages of different data/information types, or having multiple parts (multimedia mailbox).

b. A single inventory (message list), listing all messages of all data types, with the ability to control presentation of the inventory (e.g., sort the inventory according to message type, priority, or time of deposit, regardless of the type of message), with conceptually similar user interface actions for equivalent operations on any message type, and with the ability to randomly select messages for retrieval.

c. Notification mechanism(s) which can be used to alert the user of the deposit of any type of message.

d. The ability to access the mailbox through a variety of commonly-available mailbox access terminals (PC, DTMF phone, etc.), without special equipment, and with, as far as practicable, logically the same capabilities for all terminal types e. The ability to perform data type conversions automatically, in support of transparent multi-terminal user access, or upon subscriber explicit request f. The ability to receive and send messages to subscribers of existing messaging systems, using a variety of widely-implemented messaging protocols.

Note that there are degrees of integration in today's single-media mailboxes, both with respect of allowed message types and the access terminal types which can be used. For instance, integrated facsimile/voice mailboxes are common today, and e-mail can be used to transfer non-text information. Similarly, e-mail mailboxes cannot be accessed using telephones, and voice/facsimile mailboxes cannot be accessed using a PC.

Although it is possible to have a mailbox which is integrated with respect to multiple message types but which can only be accessed through a single type of terminal (e.g., e-mail systems using MIME), a fully integrated mailbox is preferably accessible from several types of terminals and pathways, to maximize the subscriber's ability to access his messages in various circumstances. The following terminal types are provided by the present invention: a. Conventional DTMF telephone handset; and b. Personal Computer (PC).

However, other terminal types such as personal digital assistants, cellular telephones, two way pagers, etc. can be used.

It should be emphasized that an integrated mailbox subscriber using the present invention is able to dynamically change the terminal used, from session to session.

The integrated messaging system (IMS) of the present invention is preferably interfaced to external systems. This allows the subscriber to exchange messages with external subscribers and can be used to integrate several existing messaging accounts on different systems so that the user accesses a single (virtual) integrated mailbox. The following types of external systems can be included:

a. The Internet.

b. Commercial subscription mail systems (usually X.400).

c. Private mail systems (e.g., MS Mail, cc:Mail).

d. CPE voicemail systems and other foreign network-based voicemail systems (e.g., the subscriber's cellular phone voice mailbox).

There are several ways, in accordance with the present invention, in which integrated messaging can be realized. However, the preferred approaches are discussed below.

The integration of the mailbox can be real or virtual. "Real" mailbox integration means that the messages of all types are located in a single messaging system (MS), and that subscriber and administrative control facilities for messages and mailbox configuration parameters are provided at a single user interface point and do not involve cooperation or interaction with any other MS. "Virtual" integrated mailboxes provide the same subscriber-visible functionality, and appear the same to the subscriber as a real integrated mailbox. However, in the virtual integrated mailbox, the subscriber's messages are stored in at least two different MSs, whose configuration can be (but need not be) performed separately. The different messaging systems cooperate to provide the complete functionality. The term "associated MS" is used to denote an MS that is in a special relationship with another MS for the purposes of synthesizing a virtual IMS, and the term "external MS" is used to denote an MS which is not so closely associated, but which still has an interface to the IMS.

The distinction between real and virtual integrated mailboxes is invisible to the subscriber. Real messaging systems can comprise multiple subsystems, such as the preferred distributed system described herein, with the "mailbox" spread across several pieces of hardware. Both types of integration need interfaces to external MSs, even if they are not part of a virtual IMS. The relationship between the MSs that are being integrated into a virtual IMS ("associated MSs") is much closer than that between MSs that just happen to interwork ("external MSs"). While an integrated mailbox system could be totally self-contained (allowing messaging only between its subscribers, like most voicemail systems today), it is preferable to be able to send and receive mail from other systems. Real mailbox integration is preferred and described in detail herein.

Several approaches are available to create a virtual IMS and are described here: a. desktop integration, b. front-end director, and c. pass-through integration.

Desktop integration (DTI) is the emulation, as perceived by the subscriber, of an integrated mailbox, when a personal computer 60 (PC), as illustrated in FIG. 1, is used for message endpoint access, there are several non-integrated messaging systems (MS) such as e-mail system (EMS) 66 and voicemail (VMS) 68, and the integration of the mailbox may not occur for non-PC access terminals; in other words, special-purpose PC software "does" the integration of the mailboxes; the MSs need no ability to handle non-native data or communicate with each other. One approach to this integration is to use a conventional browser with a local home page that includes links to the various messaging systems. Another simple DTI approach is to use separate TCP/IP connections 62 and 64 to each MS 66 and 68 on a single dialup point-to-point protocol (PPP) connection to a router 70 providing hardware dedicated to routing IP packets over various physical hardware interfaces, as shown in FIG. 1.

DTI of this type is useful when no close integration of the MSs is possible for political or administrative reasons.

Figure 2:
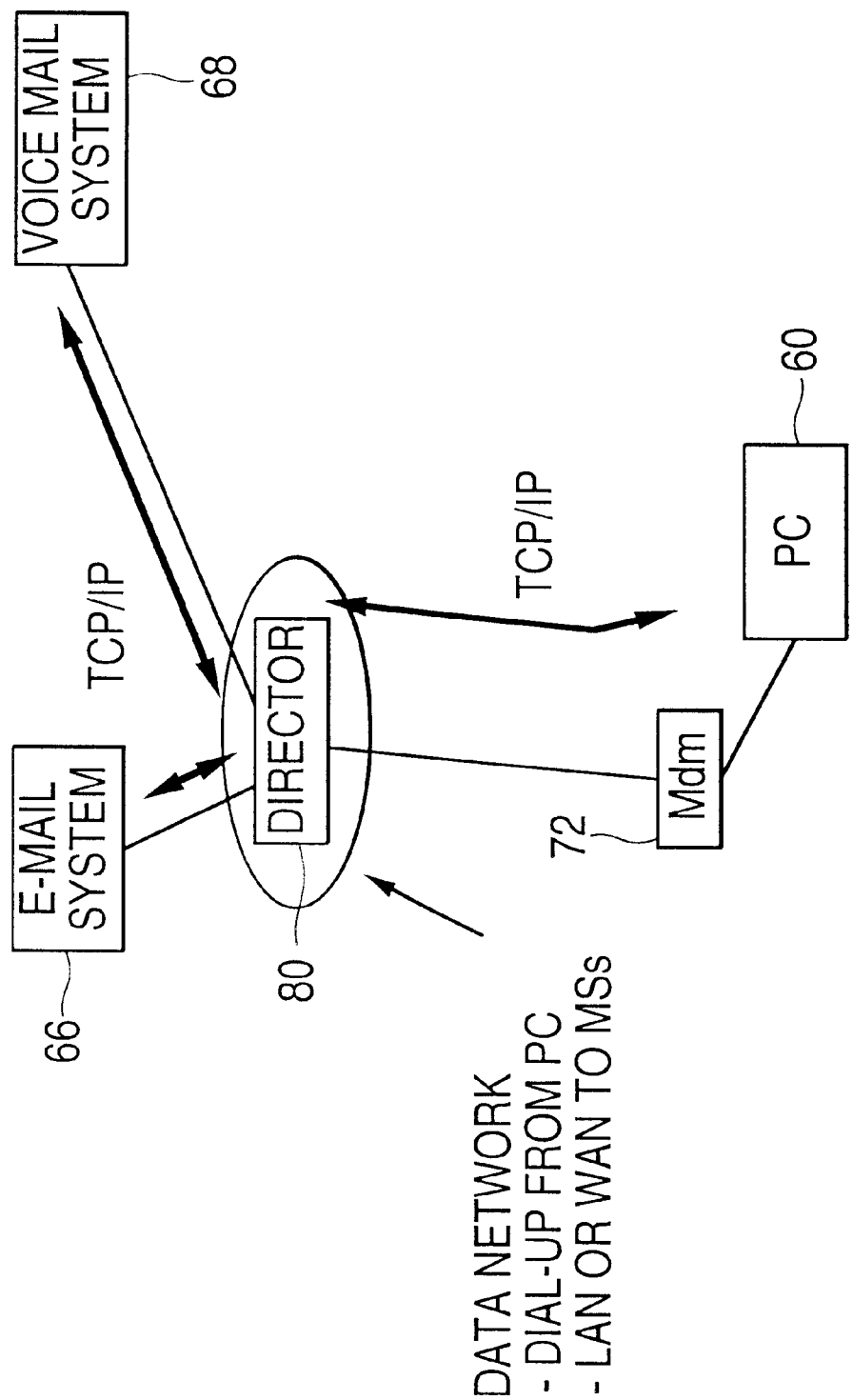
FIG. 2 depicts a unified virtual system unified by a director 80.

In another approach to virtual mailbox integration, a front-end director 80, as illustrated in FIG. 2 directly interfaces with the customer, thus avoiding changes in any of the integrated MSs 66 and 68. The director 80 communicates on the back end with the separate MSs 66 and 68 that need to be integrated. Two major variants of this approach are possible: the director 80 simply passes requests through in real-time, and thus stores no messages itself; or, the MSs 66 and 68 forward messages to the director 80 when they are deposited, and the director 80 stores them until the subscriber logs in. In the latter case, the director 80 effectively becomes a full IMS with external MS interfaces.

The director 80, if it does not store messages, accepts subscriber requests, interprets them, and then communicates with the various MSs as needed to either retrieve or send messages and inventories. The director 80 in this embodiment is essentially a transport-level or application-level relay, with some firewall-like functionality for security. The back end network is typically a local area network (LAN) or high speed wide area network (WAN), onto which subscriber requests are multiplexed.

However, to provide DTMF access, the front-end director 80 has the necessary voice, facsimile, data and voice/data telephone interfaces of a system such as that described in U.S. Pat. No. 5,193,110. In practice the voice user interface is a superset of the interface provided by the VMS 68 alone.

Figure 3:
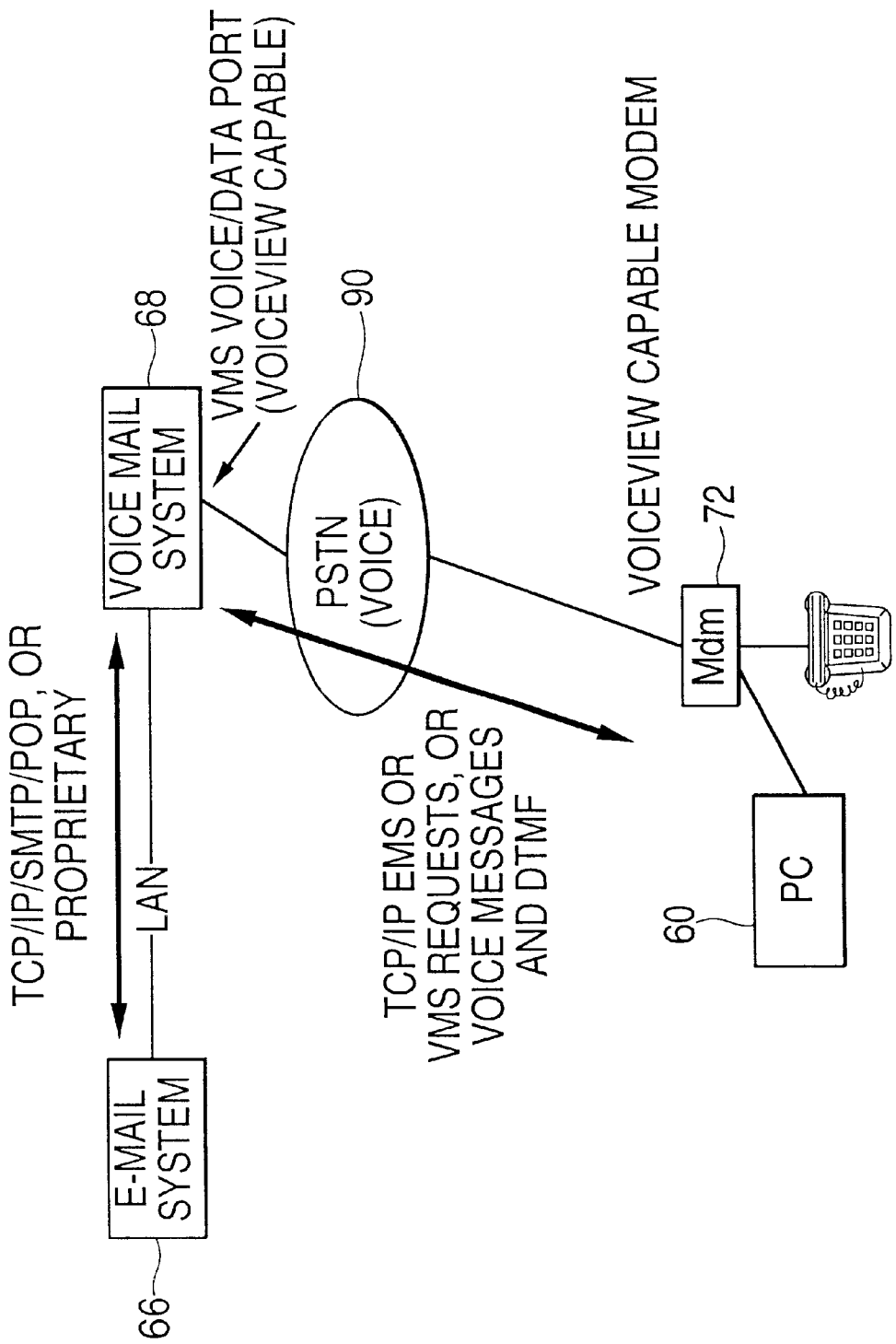
FIG. 3 depicts a voice mail system 68 performing unification.

Pass-through integration is another approach where the front-end director 80 functionality is tightly incorporated into one of the MSs, such as VMS 68. The MS deals with the messages of its native type, but acts as a real-time proxy for subscriber requests for other message types. As discussed previously, the need for both voice and facsimile as well as PC access, the difficulty of interfacing in real-time to an external VMS, the difficulty of augmenting an EMS to handle voice, and the need for VMS-like notification mechanisms results in a preference that the director be added to a VMS 68 rather than to an EMS 66 as illustrated in FIG. 3.

The foregoing discussion indicates that the preferable approaches to an integrated multimedia mailbox with both DTMF and PC access are either a full, real IM system, or enhancement of a VMS so that it can provide pass-through real-time access to other messaging systems. As a result, there are two preferred system-level architectures: a. An enhanced VMS (i.e., the IMS) which provides all message storage and all user interfaces for all types of message. All other MSs interface to the IMS as external, non-integrated systems. b. An IMS which provides permanent storage for voice, video, text, e-mail and facsimile messages and exchanges other message types on demand with one or more closely associated systems such as an associated EMS (in addition to any interfaces to other external MSs). The IMS has all user interfaces and passes through user commands related to the associated EMS(s). The IMS exchanges deposit notifications with the associated EMS(s).

Figure 4:
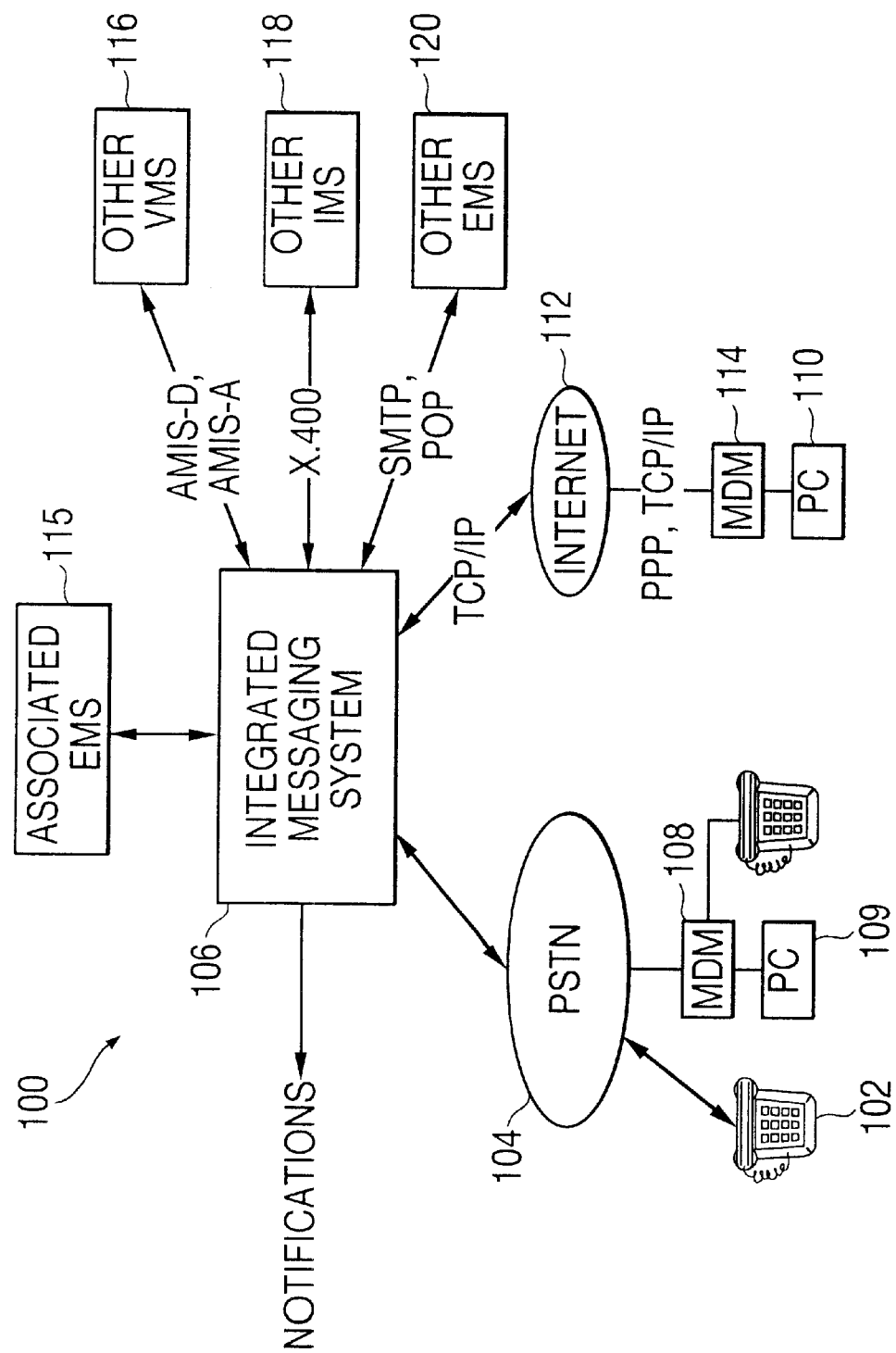
FIG. 4 depicts a real integrated system 100.

FIG. 4 illustrates the system/network architecture for either the real or virtual integrated mailbox and integrated message system (IMS). As illustrated, the system architecture 100 allows access by a telephone 102 through a public switched telephone network (PSTN) 104 to the integrated messaging system 106 either directly or through a modem 108. Access by a personal computer 109 can also be accomplished through the PSTN 104. Access by a personal computer 110 through the Internet 112 using a modem 114 is also provided. Note the associated e-mail system (EMS) 115 is shown to depict the architecture of a virtual system. The IMS 106 is also coupled to other systems 116, 118 and 120. The content of the IMS 106 will be discussed in detail with respect to FIG. 6.

The system 100 can also be provided with a multiple integrations unit (MIU) subsystem (not shown) such as described in U.S. Pat. No. 5,260,990. The MIU can host small numbers of PC sessions. This is, however, not a large-scale architecture.

The present invention has the ability to receive, send, and store messages of several data types including voice, facsimile, multipart (i.e., voice-annotated facsimile), video, text and e-mail messages. The platform 132 (see FIG. 6) is designed to accommodate the massive amounts of storage required for video data.

All messages have certain information (the message envelope) that goes along with them, such as sender, date/time of deposit, length, etc. The information varies with message type and, to some degree, with the means by which the message was received. The envelope information is preferably stored with the message, carried along with the message if it is to be delivered to an external system, and be presented to the subscriber. The IMS 106, as previously discussed, is able to present a single list or inventory, containing all messages of all types (sorted into types), to the subscriber when he logs into his mailbox, and provide the ability to select messages for retrieval. In addition, some of the message envelope information can be presented in the inventory. The amount of information presented in the inventory, and the format of presentation are determined largely by the human aspects of the access terminal; when the voice interface is used, the presentation is preferably limited to simple spoken message counts ("You have three new voice messages, one new facsimile message, and two new E-mail messages and one new video message. One voice message is urgent."), otherwise the subscriber may quickly get confused. For the same reason, complex inventory sorting, message selection or folder capabilities are preferably not provided through the voice interface, even though they can be if desired. However, a PC interface preferably shows much more information to the user without overloading the subscriber, and allows sophisticated operations such as organizing messages into folders.

Generation of integrated message inventories occurs naturally on a real IMS. A virtual IMS needs to get the individual inventories from the external systems specified for the subscriber. This is considered below in the discussion of interfaces to other MSs.

The voice interface of the present invention presents a spoken message inventory which gives counts of messages per type, and additional salient information such as whether any are urgent. There are essentially two folders: new and saved messages, plus a virtual "wastebasket" which may be emptied (or not) at the end of the session. Selection of a message to play is predetermined by the system (play only voice and text-to-speech type messages), with some limited administrator controls (e.g., play new or saved messages first); and the user cannot chose to select a specific message, other than by skipping forwards or backwards through the messages.

A PC interface according to the present invention provides an inventory much like the message list of e-mail systems. Typically, it includes, for each message: type of message (voice, video, e-mail, facsimile), subject (if any), sender, time of deposit, size of message (bytes, pages, seconds, as appropriate), and status (new/read, urgent, replied to, forwarded, etc.).

In a PC interface the user clicks an inventory entry to select the message to be retrieved; the system retrieves the appropriate message and provides it to the user in the proper format. The PC can support folders, so the subscriber can organize his messages. This can be done locally at the desktop, by moving messages to local file system directories or files. However, for the preferred type of PC interface (e.g., using a standard web browser), the folders can be implemented by the IMS 106.

Message headers preferably include important details from the message envelope for non-voice/facsimile messages. The envelope of messages received via e-mail can have a lot more detail than those of voice/facsimile messages, and are also in text format. These type envelope elements are parsed by the system 106, and spoken in the same way that sender mailbox number, date/time, urgency and other envelope elements are handled (i.e., by concatenating pre-recorded prompt fragments). Preferably, the envelope data is stored in the same way, regardless of message type, to output the non-voice/facsimile envelope in spoken format.

One problem area is in identifying the message sender to the subscriber. Ideally, the system should speak the sender's name, preferably in the sender's own voice. For messages received from a sender on the same system, the system can access the sender's name announcement (or speak the mailbox number if there is no name announcement). The same is true of messages from other systems connected through digital networking using the Digital Messaging Network Version II (DMN II)™ system available from Boston Technology Inc. of Massachusetts. Digital Messaging Network Version II (DMN II)™ conforms to the AMIS-D voice messaging protocol, which passes the name announcement of the sender along with the message, using X.400 and a real time DMN II protocol to retrieve remote name announcements during message addressing between systems.

For non-voice messages received from other vendor's platforms (including X.400 and MIME/SMTP messages from the Internet), the sender address information is a character string, and there is no explicitly identified name announcement. Of course, an X.400 or MIME voice body part can be included with any message, and so the sending system can send a name announcement. However, the receiving system will not know it is the name announcement and just play it as part of the message body. An example of such an address is "bill@abc.com". The receiving system 106 parses this string and speaks in the same way as a mailbox number, character by character. Text-to-speech could also be used, but there are problems for today's text-to-speech technology in handling an infinite variety of strange words (such as "abc"). In any case, it is often clearer to spell out the address when spoken. A preferred solution is to use the prompt voice fragment approach with additional prompt fragments for common address elements, to output (for example) the voice prompts "b" "i" "l" "l" "at" "a" "b" "c" "dot" "com" for the address noted above. This does not require text-to-speech capability.

The need to handle messages from the external MSs 116–120 means that some voice messages will be received in encodings other than the native format of the platform. Examples would be MIME messages containing audio/wav body parts, or .WAV files. The present invention can output this data to the telephone line just as easily as the native format using the freeware software package SOX. An alternative is to convert everything to the native format, but this can cause quality loss if the data subsequently needs to be converted to some other format for output over some other interface and is not preferred.

For output to a conventional telephone, non-voice messages of the text data type are converted to voice, or otherwise represented by voice. However, there are some structures (such as the MIME multipart/parallel) that may be too complicated, or not useful, or impractical to output to a voice telephone. In such a situation, the system should indicate to the subscriber the type of the message and other envelope information, and explain that it cannot be retrieved from a DTMF telephone using a standard voice message.

However, a picture-telephone can receive image type mail messages.

Recording of a voice, facsimile or voice-annotated facsimile message over the voice interface is performed in a conventional manner. To generate other data types DTMF key entry is used to select from a menu of simple parameterized pre-canned messages. For instance, a caller can send text messages containing a callback phone number to a subscriber's cellular handset or pager. The present invention provides these capabilities for video, text, e-mail messages, as well as for other data types (facsimile back services are an example of similar usage).

The limitations of the DTMF keypad do restrict the ability to address the message to non-numeric addresses. In the present invention, however, a group address containing non-numeric addresses (defined using the PC interface) can be specified through the DTMF interface. The present invention also allows a reply with a voice message to any received message from any sending address. The system 106 records the voice and deposits it in the local sender's mailbox, or converts it to an appropriate MIME, AMIS-D or X.400 body part using DMN II or the functions of a client e-mail reader such as MSExchange, cc:Mail or Netscape, Internet Mail, and sends it to the original message sender's address, if external.

Speech-to-text, or voice recognition, is also a means to send text messages from a conventional telephone and also a way of addressing non-numeric addresses (by spelling them out).

Forwarding is the copying of a message and the deposit of the copy in a different mailbox, or transmission to a third party. Forwarding of non-voice messages is provided by the present invention through both the voice interface and the PC interface because when the message does not need to be converted to voice, such as for facsimile messages, the message can be sent either to another mailbox, or to a subscriber-entered facsimile telephone number, without actually retrieving the message. This approach is also used by the present invention for other data types (video), as is the turnaround of lines for alternate facsimile/voice use. When the destination is not the same IMS the message is format converted as needed. Forwarding to another mailbox on the same IMS is implemented in the same way as for voice and facsimile, and operates independently of data type. Forwarding to a telephone number, when done automatically by the system, is considered a form of message deposit notification. The same mechanisms are used for forwarding, so we address it below.

Facsimile machines may also be used to access the system 106 via the dialup voice interface; often, the facsimile machine may actually be a PC running facsimile software. The system of the present invention has facsimile modem capabilities, and handles facsimile messages in a variety of ways, often in conjunction with a DTMF telephone for control and listening to voice annotations. The system stores facsimile messages in their native form (tiff) and no conversion is necessary. The additional complexities for the IMS relate to the output of non-facsimile messages to facsimile machines. To do this the system converts text messages and non-facsimile image data to facsimile format using a function available from Natural Microsystems or the public domain software pbmplus can be used to convert to/from various picture forms. Exchange of facsimile data with external systems is performed using both MIME and X.400 for G3 facsimile body parts.

For PC access, two physical interface types are provided: dialup to the IMS telephone ports, and via the Internet (or another TCP/IP network). In addition, several ways to handle voice messages are provided: purely digital, where the voice data is simply transferred like any other type of data (such as by using a browser as previously discussed), and the PC turns it into audio; the use of a voice/data line-sharing scheme, such as provided with the VoiceView system available from Radish (the latter would only be available through the IMS dial-up ports) and transfer of the voice data via an e-mail attachment with the conversion to audio occurring in the PC.

Accommodating access from a PC (see FIG. 6) can be provided through an APU 150 and IPU 146 (NIU) hosting SMTP/MIME and POP protocols. Because of the rapid growth in Internet connectivity and on-line services, message user agents (MUAs) (or client mail readers) using these protocols are becoming universal for subscribers using dialup access. However, the Hypertext Transfer Protocol (HTTP) is the preferred protocol since it is the one used to interface with standard web browsers. It is a simple request/response protocol which uses TCP/IP. Requests (called methods) are provided to get and create objects (real or synthesized data), and to do other operations in support of navigating a global, interconnected set of information. The subjects of the methods are identified by a Universal Resource Identifier (URI) or Locator (URL) which specifies the location (including the Internet name of the host where the information is stored) and the means to access the object. Responses are returned to a requester in MIME-compatible format, so the MIME content-type and content-encoding can be determined by the requester, and the object presented in the appropriate way. To actually provide the "web" of connected objects, specially-formatted text scripts or templates, using the Hypertext Markup Language (HTML), are used. These "web pages" can have embedded links to other objects (systems/hosts), as well as presentation control capabilities. The browser follows these links by using the linked object's URI to send a GET request to the host identified in the URI, when the user selects the URI. By putting links to further pages (HTML static documents, or dynamically synthesized documents) in a web page, a hierarchical organization of information can be established. HTML and HTTP also support entry of data via forms, access to files via FTP, and interfaces to other information systems, such as e-mail, GOPHER, and News.

To provide the PC 109 or 110 (see FIG. 4) with web browser access, the IMS 106 of the present invention provides an HTTP server (IPU 146) to handle the requests from the browser, and provides an organization of the information in the IMS 106 into a logical structure, using HTML pages as will be discussed in more detail later.

In general, HTTP servers are widely available, both as public domain source code, and as commercial products. Toolkits are available to simplify page creation. HTTP servers are highly configurable, including the mapping of universal resource locators (URLs) to internal (or external) data or operations (executable scripts).

A simplified example of an HTML page hierarchy for the messages stored in the IMS and the subscriber operations used to access messages is given below. Sample URLs are given to aid understanding.

a. Subscriber (or caller) uses a browser 144 (see FIG. 6) on a PC 142 to open subscriber's own IMS home page (e.g., "http://www.mail.somerboc.com/JoeQUser/", or "http://www.mail.somerboc.com/617-246-9000/") or http://www.mail.somerboc.com/awscripts/btv.dll?REFRESH. A "bookmark" could also be used to remember the URL.

b. The PC 142 dials directly to the IMS 132 or via an Internet service provider (ISP) 140, and connects to the IMS host 132. The PC 142 sends an HTTP GET method for the home page URI.

c. The IMS HTTP server 146 sends the home page in the response to the GET, and the PC's browser 144 displays it. The home page has welcome text and/or graphics and/or voice announcement, including a password entry field. For users wishing to leave a message for the subscriber instead of logging in, there is preferably a "button" on the subscriber's home page to "leave a message." The calling line identifier (CLI) can be used to verify that the calling number matches the subscriber name, or for using the authentication capabilities of HTTP. A secure socket layer (SSL) is used to provide an initial secure connection for authentication. A menu of additional services besides integrated messaging can also be provided.

d. Using the browser 144, the subscriber enters the password in the login information form, the browser 144 sends it to the HTTP server 146. The server 146 validates the password and synthesizes the subscriber's main messaging page ("http://www.mail.somerboc.com/JoeQuser/inbox") from the contents of the subscriber's message store, and returns the page to the browser 144. The subscriber's messaging page contains links to each of his stored messages ("http://www.mail.somerboc.com/awscripts/btv.dll?REFRESH) and whatever inventory information ("http://www.mail.somerboc.com/awscripts/btv.dll?DRTR&Unique MsgId) is desired for display, plus buttons for sending, deleting, forwarding or other message actions.

e. If the user clicks a message link, the message is retrieved by the HTTP server 146 from wherever it is stored. The message is formatted and encoded as a MIME message, and is presented by the browser 144 according to the MIME type (text, image, video, voice, etc.). Voice and facsimile messages stored need to be converted to MIME format first.

f. Buttons are also links to URIs. If the subscriber clicks a button, the HTTP server 146 may simply use the URI as a command name and perform the action, or it may return an HTML form to allow further user input, or to give more details about some entity.

In the present invention, an HTTP server is provided in each application processing unit (APU) 150 (see FIG. 6) that is configured to handle data calls. In addition, an HTTP server (IPU 146) is provided for subscribers accessing the IMS 132 via an ISP 146 and the Internet 136. For small numbers of concurrent PC sessions, the MIU previously mentioned, with modem banks, can also be used to provide PC dial-up access. Note that all HTTP servers are configured identically, and use the distributed subscriber database access mechanisms (in the same way as a voice application) to locate and retrieve subscriber data and messages, even when they are not on the same APU. The HTTP servers use the existing platform operating system TCP/IP and PPP protocol capabilities.

Two situations for data type conversion can arise: when a subscriber's terminal type will not accept the stored message format, and upon user request. An intermediate situation is when a subscriber requests delivery or forwarding of the message to a system or terminal, other than the one he is using, which does not support the data type. Most conversions are implicit from the message type and the destination, but it may be preferable for a subscriber to explicitly request conversion (e.g.) of a facsimile message to text for forwarding to an Internet address, even though the message could have been sent as a MIME facsimile message.

For the IMS of the present invention, messages are preferably stored either in native voice format as described in U.S. Pat. Nos. 5,029,199 and 5,193,110, native facsimile format (preferably conventional tiff), or in a MIME format. For PC access, or delivery to a PC via outdial, handling of data other than native voice data is preferably by sending it unconverted using the stored MIME format. Facsimile information is preferably sent in the MIME image/tiff format. Voice data is preferably sent as the MIME audio/wav type.

Notifications are used primarily to alert a subscriber that he has messages, so the subscriber need only access the system when messages exist. Notification mechanisms vary from the communication of one bit of information (messages present or not), to delivery of the actual messages themselves.

The present invention, using Access NP™, provides comprehensive notification delivery capabilities including: paging via outdial, TAP and TNPP; message waiting indication (MWI), via SMDI, and using various SS7 or ISDN capabilities; special delivery outdial (delivery of voice and facsimile messages by outdialing the subscriber at a specified telephone number); and cellular short messages, containing mailbox message counts or callback numbers.

Most of the above do not actually deliver messages, and so require no message data type conversions. Special delivery, however, is more complicated. The destination terminal must be capable of receiving the data type, or the system must be capable of recognizing the terminal type and converting the message accordingly. The data conversions discussed (e.g., text-to-facsimile or text-to-speech) should, however, handle most notifications. Special delivery via outdial to a PC is also provided.

In addition to data conversion for special delivery, it is necessary to consider how other message types affect the notification algorithms. One approach is to handle them in exactly the same way, so that any e-mail message causes the MWI light of the subscribers telephone to come on, or causes a page to a pager if it is marked urgent.

A real IMS is self-contained for notifications, in that any message which is to be notified is stored in the IMS. However, in a virtual IMS, one MS does not store all messages. Further, some of the integrated message systems may have no notification capability. Thus, there needs to be a way to communicate the presence of messages between MSs ("cross-notification"). This may require non-standard mechanisms, since most MSs are not designed to accept notifications. This, in turn, may require MS modifications, which defeats much of the purpose of a virtual IMS. Below we discuss how to provide VMS exchange notifications with an associated EMS, without major EMS modifications.

An associated e-mail system (EMS) will preferably have one of SMTP/MIME and POP protocol capabilities (or equivalent X.400 capabilities). The EMS can initiate SMTP sessions, but the VMS must initiate POP sessions. The EMS is configured to automatically create a copy of each message deposited, or an additional message with inventory information, give the message a special VMS recipient address, and send it via SMTP to the VMS (IMS 106). This has desired asynchronous notification characteristics. The VMS (IMS 106) receives the message, parses it (or merely notices it), and uses the information to control the notification mechanisms (but not store it). Alternatively and less preferably, the VMS (IMS 106) uses POP to poll the subscriber's message inventory. This is a periodic event, likely to cause a lot of traffic, since it needs to be fairly frequent and there could be large numbers of subscribers. In either situation, the VMS (IMS 106) needs to be provided with the subscriber's e-mail address and password.

There is also a hybrid of the above-discussed approaches where the VMS is an IMS, and it uses POP to retrieve EMS messages but also offers POP to the subscriber so that client e-mail SW connects to the VMS(IMS) to retrieve e-mail messages.

For notifications from the VMS to the EMS, the VMS sends an e-mail text message containing the voice/facsimile message inventory using SMTP.

For both real and virtual IMSs, there is a need to interface with external systems 116–120 using the regular store-and-forward e-mail paradigm, in order to make the IMS subscribers part of a single world-wide messaging community. For the virtual IMS, special consideration must be given to the "associated MSs", since that non-standard (for e-mail systems) but conventional techniques need to be applied.

The Access NP™ platform available from Boston Technology, Inc. provides AMIS-D (digital) and AMIS-A (analog) networking for transferring messages to other VMSs with the requisite protocol support. This includes most VMS vendors. The system handles voice data according to the AMIS-D specification. It also has downward-compatible enhancements for interworking with other systems, so that multiple Boston Technology IMS clusters become essentially connected in near real-time.

For interfacing with external VMSs, or between Boston Technology, Inc. IMS platforms, AMIS-D is preferred. The X.400 technology is also usable for interworking with other X.400 mail systems, allowing connectivity through X.400 administrations to many e-mail users. Since almost all X.400 public mail systems have Internet connectivity, this is a preferred approach to providing world-wide connectivity for IMS subscribers.

When external MSs do not have X.400 interfaces, MIME/SMTP protocols are the next most preferred choice, both for Internet connectivity and for connection to corporate LAN mail gateways.

For a virtual integrated messaging system (IMS), some of the systems outside of the VMS 68 need special treatment, so that the message endpoints of the MS (for example, e-mail system 66) appear to be part of the same integrated mailbox as the VMS message endpoint. Interfaces and operation for the "pass-through director" approach to virtual IMSs will be discussed in more detail (notifications have been addressed above already). As for notifications, an EMS with SMTP and POP capabilities, connected as shown in FIG. 3, is assumed.

The general handling of a virtual IMS subscriber's operations in a virtual IMS will be described below for each of the typical phases of a session.

When the subscriber logs into the VMS 68, the VMS 68 generates an integrated message inventory. This is done through the use of a POP session between the VMS 68 and the EMS(s) 66. The VMS 68 logs into the POP server on behalf of the subscriber (POP USER and PASS commands), queries the EMS inventory (POP LIST command) and merges it with the local inventory. The VMS 68 maintains a map from the POP message IDs to an identification (place in sequence, ID number or synthesized URI) used between the VMS 66 and the subscriber. Locally stored messages are likewise given identifiers.

To select a message for retrieval, the subscriber interface may use POP (for MUA interfaces), an HTTP GET method (for web browser interface access), or enter DTMF commands (for voice access). In any event, the VMS 68 maps the subscriber-requested message ID or URI to the EMS message ID, or to an internal message ID. If the message is on the EMS 66, the EMS 66 uses POP to retrieve the message from the VMS 68 (POP RETR <msg id>command), and outputs it to the subscriber. If the message resides on the VMS 68, it is simply retrieved and played. Data conversions, if necessary, are performed as described earlier.

To submit a message, the VMS 68 needs to determine whether the message is to be sent to the EMS 66 or handled by the VMS 68. If the former, then the DMN II system previously mentioned (using the X.400 protocol) is used to forward the message to the EMS 66. The criteria for the decision would typically include the recipient address and the message data type. There are many possibilities for the algorithm; the preferred is:

a. If the message is native voice or facsimile (i.e., using the DTMF interface), and the recipient address is a phone number, the message is handled in the conventional VMS manner for a voice or facsimile message.
 b. If the message is native voice or facsimile, and the recipient address is not a phone number, the message is sent to the EMS 66, with the data converted to a MIME audio or image/tiff type.
 c. If the message is a MIME audio or facsimile type (i.e., SMTP or HTTP user interface), and the recipient address is a phone number, the data is converted to native format and handled as conventionally by the VMS (note: addressing to a phone number could be prohibited to avoid this conversion, initially).
 d. If the message is any MIME type, and the recipient address is not a phone number, the message is sent unchanged to the EMS 66.
 e. When messages are sent to the EMS 66 for handling, the sender address is set to the e-mail user name of the subscriber, so it appears that it originated in the EMS 66.

The approach discussed above is a straight forward way of operating. There are much more complicated ways of doing it. The advantage of the simple approach is that the VMS involvement in handling e-mail messages is minimized.

Figure 5:
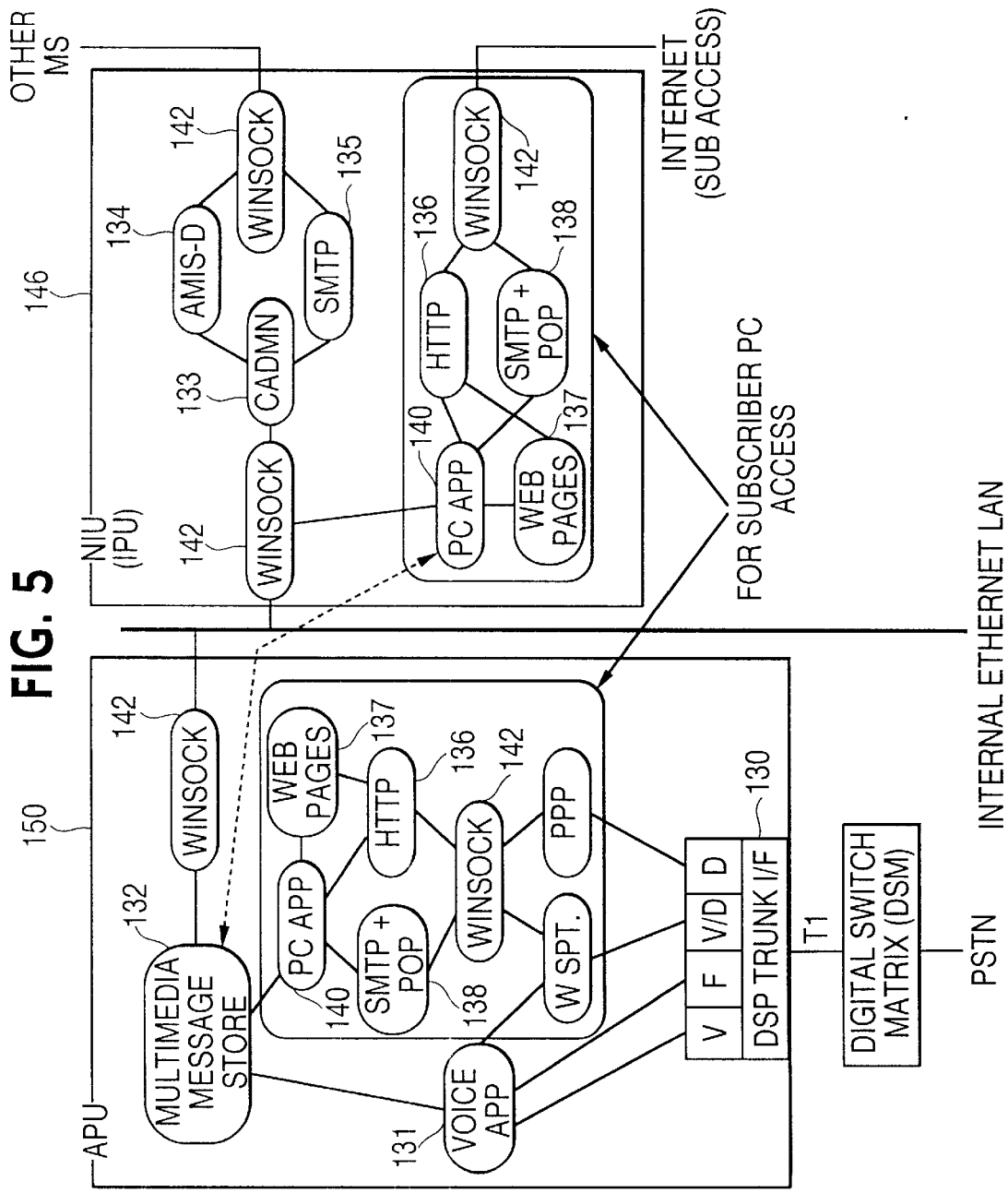
FIG. 5 depicts the functional architecture of a system according to the present invention.

FIG. 5 illustrates a general functional architecture for a real IMS which provides the capabilities discussed above. A more detailed description will be provided with respect to FIG. 1.

Various elements of the architecture will be discussed. Note that FIG. 5 is not intended to be a definitive and complete representation of the actual software architecture of the IMS which will be described in more detail with respect to FIG. 6.

The dialup interfaces 130 in the APUs 150 have drivers for access to conventional DSP hardware, providing voice interface functions (V), facsimile modem capabilities (F), data modem capabilities (D) and VoiceView voice/data modem capabilities (V/D).

For DTMF access, the voice application 131 is the application described in the related patent previously mentioned, which accommodates multimedia messages and data conversions, for example text-to-speech and text-to-facsimile.

The multimedia message store 132 is distributed across all the APUs 150, with most of a subscriber's messages being stored on a "home" APU. Standard methods are used by applications in any subsystem to access the distributed message store in a location-independent way.

The Boston Technology, Inc. Digital Messaging Network Version II (DMN II)T product 133 provides store-and-forward communication with other MSs, including other Boston Technology IMSs or VMSs, other vendor's VMSs, and external EMSs. Either the AMIS-D protocol 134 or SMTP 135 is used for this. DMN II is automatically activated when a message requires delivery to an external address.

The subscriber PC access functions reside in the APU 150 for dialup access, and in the NIU (IPU 146) for network access. Both instances of this set of functions are essentially the same, except that the datalink protocols are different.

An HTTP server 136 is provided in the IPU 166 to allow access using conventional web browsers and associated web pages 137, and SMTP and POP servers 138 are provided to allow access from MUAs. All other services POP3/IMAP4/Voice/PPP/X.400 are utilized on other components and in turn utilize the IPU 166 for HTTP if necessary.

The PC application 140 provides the structure of the user interface for HTTP access, and the necessary "glue" to interface with the internal system mechanisms (in this case, just the message storage).

Microsoft WinSock 142 is used to provide the TCP/IP protocol support, both externally and internally. WinSock is an integral part of Windows NT, and includes support for VoiceView data transfers. For Boston Technology, Inc. platforms using the Unixware OS, the TCP/IP support is also part of the OS, but VoiceView is not supported.

Figure 6:
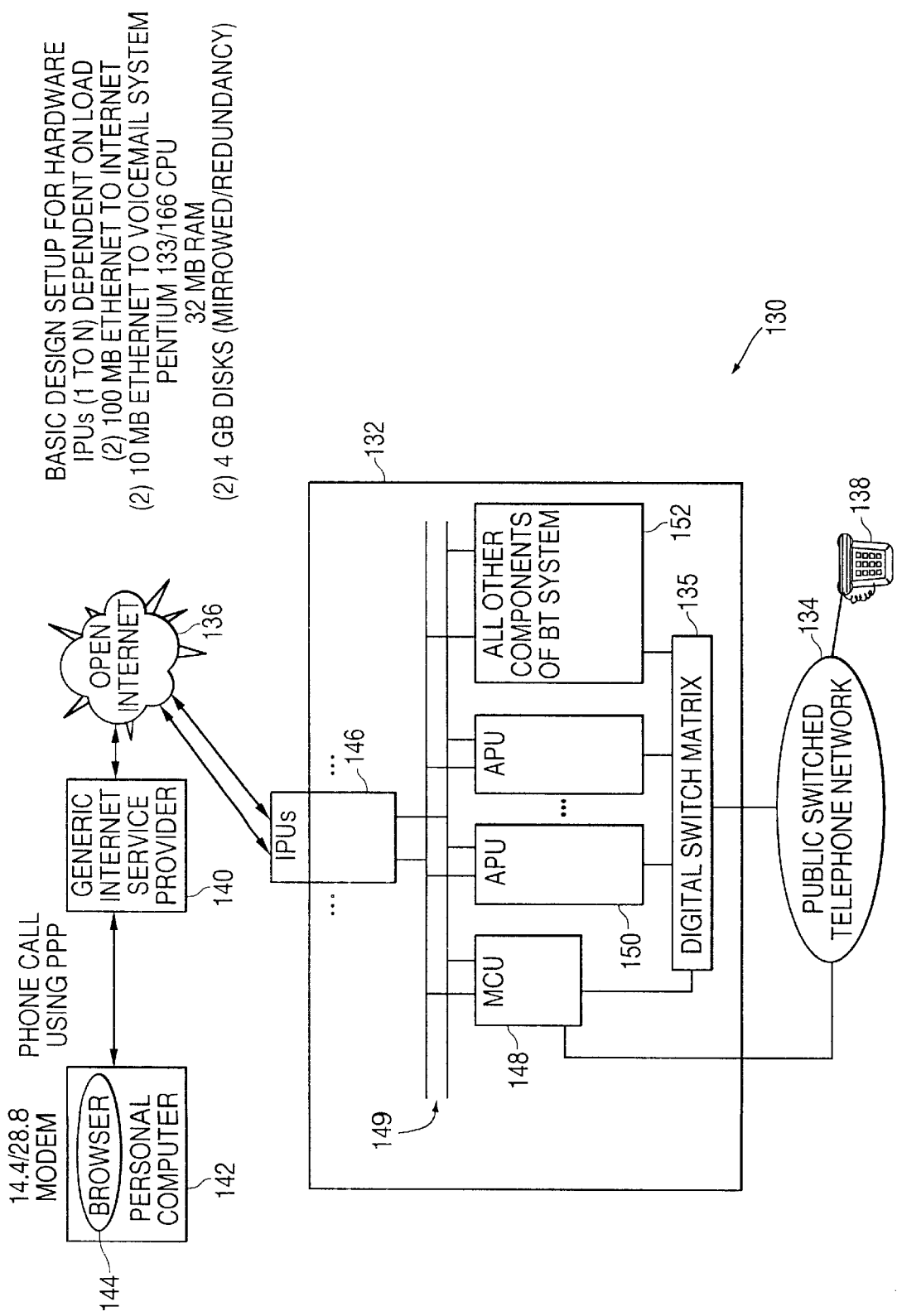
FIG. 6 depicts a distributed architecture system 130 according to the present invention.

The "real" IMS system 130 (106) of the present invention is preferably implemented using a distributed architecture such as illustrated in FIG. 6. The system 130 includes a message platform 132 that is connected to both the public switched telephone network 134 (via a digital matrix switch 135) and the Internet 136. A subscriber can access the platform 132 using a telephone 138 to perform message access functions such as retrieving and listening to voice mail messages, forwarding messages, recording messages, and converting and playing facsimile messages. A detailed description of this type of access can be found in the U.S. patents previously described and is available in the CO Access® and Access NPTM systems from Boston Technology, Inc. The subscriber can also access the platform 132 for accessing voice mail messages and other types of messages such as facsimile and video messages over the Internet 136 through a conventional Internet service provider system (ISP) 140 using a personal computer 142.

The personal computer 142 is a typical conventional multimedia personal computer capable of running or executing an Internet browser 144, such as the preferred Netscape 3.0 browser available from Netscape Communications or Internet Explorer 3.0 available from Microsoft, and capable of connecting to an Internet service provider 140. The PC 142 can also, of course, be connected to the Internet through a company local area network (LAN) via a high speed connection. The computer 142 preferably includes a modem with a speed of at least 14.4 Kbps and preferably at least 28.8 Kbps when the user intends to access video images. The computer 142 also includes a conventional sound card and associated audio speaker and audio software such as the preferred TrueSpeech available from the DSP Group. For the recording of voice messages that will be transmitted to other mailboxes the computer 142 needs a microphone half duplex recording board such as SoundBlaster from Creative, Inc. and software such as MediaPlayer from Microsoft. For displaying still images, such as facsimile mail, the computer 142 needs to include a tiff reader such as Microsoft Facsimile available from Microsoft Corp. These still image components can also be used to record facsimile messages for transmission to other mail boxes. For the playing of motion video images, the computer 142 uses ActiveMovie from Microsoft. If video images for broadcast are to be recorded the computer 142 needs a conventional camera and associated software such as Connectix from Connectix, Inc.

The browser 144 is used in a conventional method to access an Internet web page hosted by the platform 132. The browser 144 allows the user to perform functions such as viewing a message list, view addresses of voice/video mail recipients and senders as well as e-mail addresses, playing and saving messages, forwarding messages to others, replying to messages, creating, listening to and modifying personal greetings, name announcements and prompts, etc. using the graphical user interface and the video/sound capabilities of the computer 142.

The user accesses the platform 132 through one or more Internet processing units (IPUs) 146 over a conventional digital communication path typically used for high speed access (10–100 Mb/s) of a home page server. The unit 146 is preferably a pentium based computer that operates at 133/166 MHz with 32 MB of RAM and 4 GB hard disk drives that are mirrored. A conventional Internet router (not shown), such as available from Cisco Systems or Bay Networks which performs packet filtering, can also be provided between the Internet 136 and the unit 146. The router can provide a "bridge" between the ethernet 149 and the network backbone. In such a configuration the router and unit 146 would be coupled preferably using a 100 Mb Ethernet connection and perform the primary function of moving packets to and from the IPU 146. The unit 146 provides firewall protection from hackers, acts as a web server for the messaging application, performs hypertext markup language (HTML) generation and performs the voice encoding and image encoding for the messages streamed to the computer 142.

During a typical session a user will access the platform 132 over the Internet 136 using a standard web browser to obtain a service provider home page where the user will log into the Internet service provided by the platform 132. During this process the user is required to enter a mailbox identifier and a pass code which are checked to ensure that the user is authorized. Once authorization is confirmed a service session is initiated and the user is presented a page that includes a menu of service options such as viewing a message list, administering mail box options, other network service features, etc.

When the user's e-mail is stored and supported by another platform the message list can include a cross notification of the existence of an e-mail message in the mailbox message list.

During a typical message retrieval function, the unit 146 accesses a master control unit 148 over an internal dual channel ethernet 149 to locate the storage location of the various types of messages stored for a subscriber and generates a web page which is transmitted to the personal computer 142 and which includes a list of the messages. The user selects a message in a conventional fashion by double clicking on a message descriptor or selecting the message and clicking on an appropriate icon such as "Play" in the display of the browser 144. The unit 146 responds by obtaining the selected message from the application processing unit 150 that stores the message, converting the message into the proper format and transmitting it. In the case of voice messages the voice data is converted from the encoding for storage into a file in the encoding for playing used by a conventional audio application executable by the browser 144 such as the preferred ActiveMovie from Microsoft and streamed to the browser 144 where it is played as it is received. For facsimile and other text messages a tiff file is created and transmitted to the browser 144. For video messages the video data, if necessary, is converted into the avi, mpg, mpeg, cu, etc. file formats that allow the data to be streamed to the browser and displayed in a pop-up window in real-time as it arrives. That is, video as well as audio messages are played or displayed as received by the computer 142. During play back the user can perform the conventional functions of rewinding, pausing, fast-forwarding, skipping, etc. The user can also perform operations associated with saving the message, deleting it or forwarding it to others. The processes performed by the Internet processing unit 146 as well as those performed by the master control unit 148 and application processing units 50 and other units 52, will be discussed in more detail later and are set forth in the source code appendix which code can be stored on/in various types of media, such as various types of disks and various type of computer memories, in the platform 132.

The operations or entry points available to a user interacting with the browser 144 include the following functions:

| | |
|---|---|
| QUIT | Exits out or logoff of the system and delete all session information. |
| DELE | Removes one or more messages from the system. |
| SAVE | Saves a message. |
| DRTR/RMSG | Retrieves data such as an audio message. |
| RECORD | Sets and starts record/send process. |
| REFRESH | Gathers data and instantiates to browser in HTML. |
| USE | Selects a specific template. |
| GRTR | Retrieves particular group list data. |
| GDEL | Deletes a group list. |
| GINS | Adds a single entry to group list |
| GUSE | Get group and use template. |
| GPUT | Modify current group lists. |
| GNEW | Make new list. |
| MBOXADM | Administer user mailbox features such as change the password. |

Each of these operations has a routine of a corresponding name in the source code appendix. The processes for the above-listed functions perform many of the same operations such as authenticating a request, however, for simplicity of explanation three representative processes, the process that refreshes (REFRESH) the browser display, the processes (DRTR/RMSG) that download messages for playing/displaying and the process records (RECORD) messages to send to others, will be discussed. The other processes are described in detail within the source code appendix.

Figure 7:
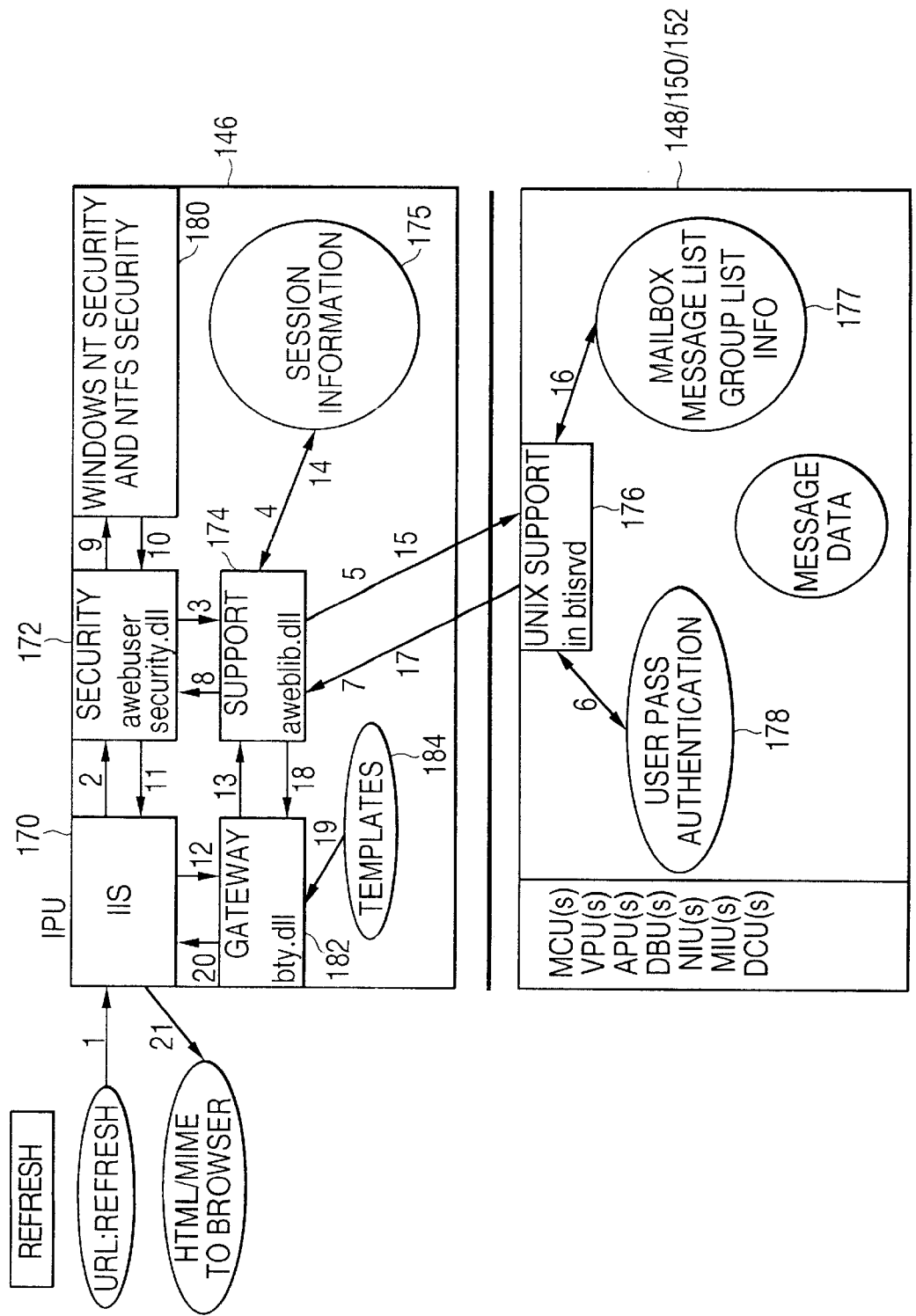
FIG. 7 illustrates the flow of control during a refresh operation.

The refresh operation steps, with the data, accessed, are depicted in FIG. 7. The refresh operation is integral to the display update operation of the invention because each of the web pages that are transmitted to the computer 42 is affixed with an expiration date, such as yesterday, that causes the browser 144 to request a reload of the page each time the page is accessed or additional information is requested. This results in the message list being updated to include messages that have arrived since the current session started. The refresh operation is also used to provide web pages that the user has selected during browsing where the refreshed page has never been transmitted. The refresh operation starts with a refresh request (a "GET" with a URI) being sent 1 to the Internet processing unit 146. The IIS routine 170 denies access if the authentication for the request is not present. If the authentication is present the request is passed 2 to the security filter routine 172. The security filter 172 sends 3 the request to the support 174 for authentication by the platform 132. The routine 174 checks 4 the session information data 175 to see if a "session key" currently exists for the request and if so the flow skips to step 9 discussed below. If the session key does not exist the authentication request is sent to UNIX support routine 176 of the MCU 148 and/or APU 150 for authentication. The authentication involves accessing 6 the user authentication data 178 and returning 7 an indicator of success or failure at the authentication task. The authentication successful result is returned 8 to the security filter 172 otherwise processing proceeds to step 21 where a message concerning the authentication failure is returned to and displayed by the browser 144. The security filter 172 transfers 9 control to the validation routine 180 where account and file systems permission validation is performed and which returns 10 the result of validation. If validation is not successful, control transfers to step 21 where a failure message is sent to the browser 144. If the validation is successful control transfers 11 and 12 through the Microsoft Internet Information Server (IIS) routine 170 to the template update routine 182. Routine 182 transfers 13 the control to routine 174 to access 14 and check the state of the session cache 175. Once this check is completed a request 15 for an update of the message/group information is presented to the routine 176. The routine 176 obtains 16 the mailbox list information or group list information 177 stored in the MCU 148 and returns 17 the information to the unit 146 where the session cache is updated. The updated data is forwarded 18 to the HTML template update routine 182 where the current template from the template file 84 is instantiated 19 to match the data in the session cache 175. The data of the template is passed 20 to the IIS routine 170 where the HTML template for the page is returned 21 to the browser 144 which displays the refreshed page to the user. The templates preferably use the Microsoft.htx file syntax and the templates include standardized variables for the various data, such as <%AccountNumber%>, <%From%>, <%Media%>, <%Length%>, etc.

The transmission of the HTML for a template allows the service provider to customize the home page (for example, by adding advertisements) and deliver pages based on the domain or class of service of the subscriber.

Figure 8:
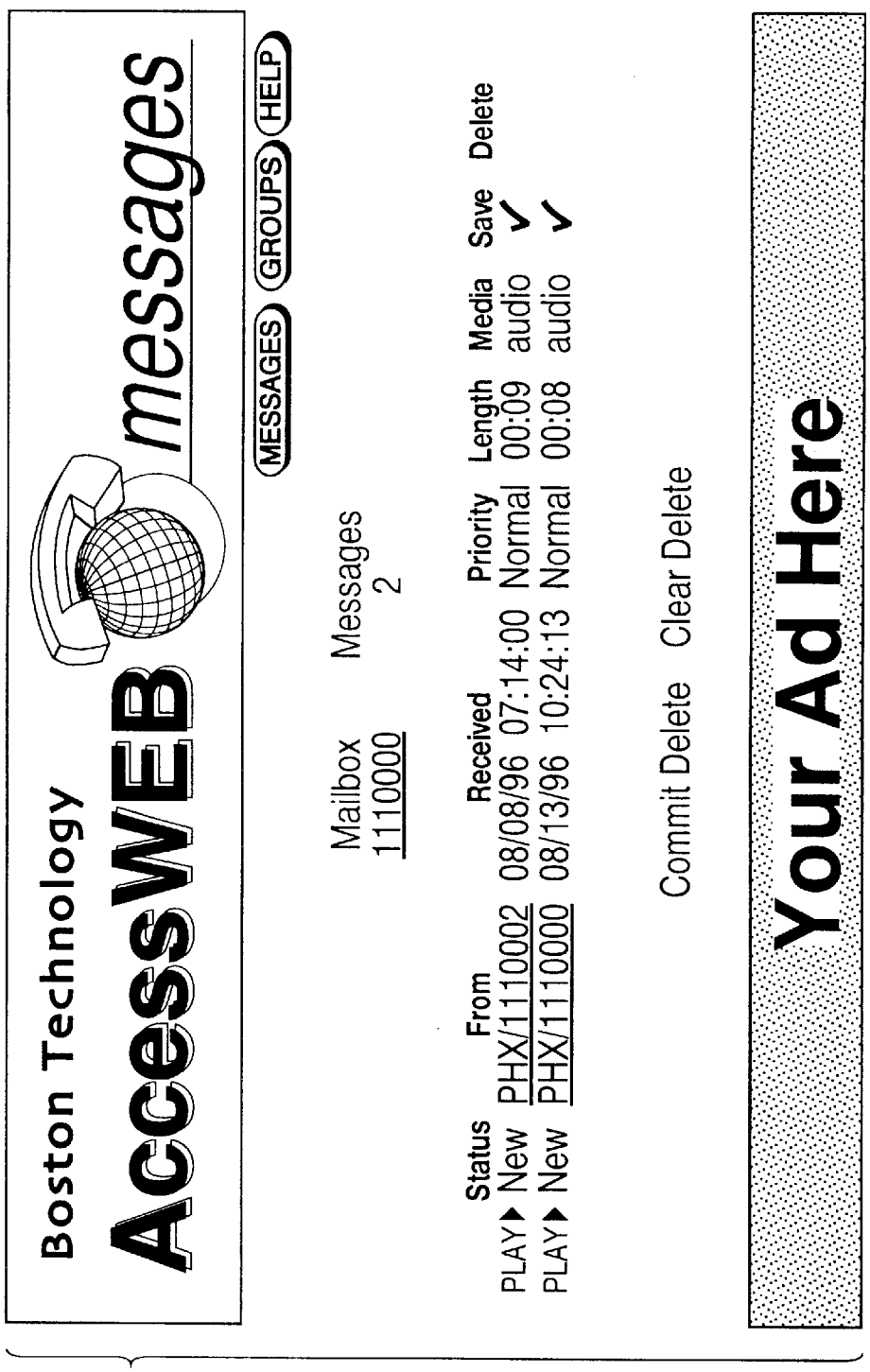
FIGS. 8 and 9 depict message list and group list templates, respectively.

A refreshed active page that is designed to list stored messages can be formatted as illustrated in FIG. 8. The messages can be accessed (played/displayed in real time), saved, deleted from the platform database and saved to storage local to the personal computer 142 using the conventional point an click paradigm.

Figure 9:
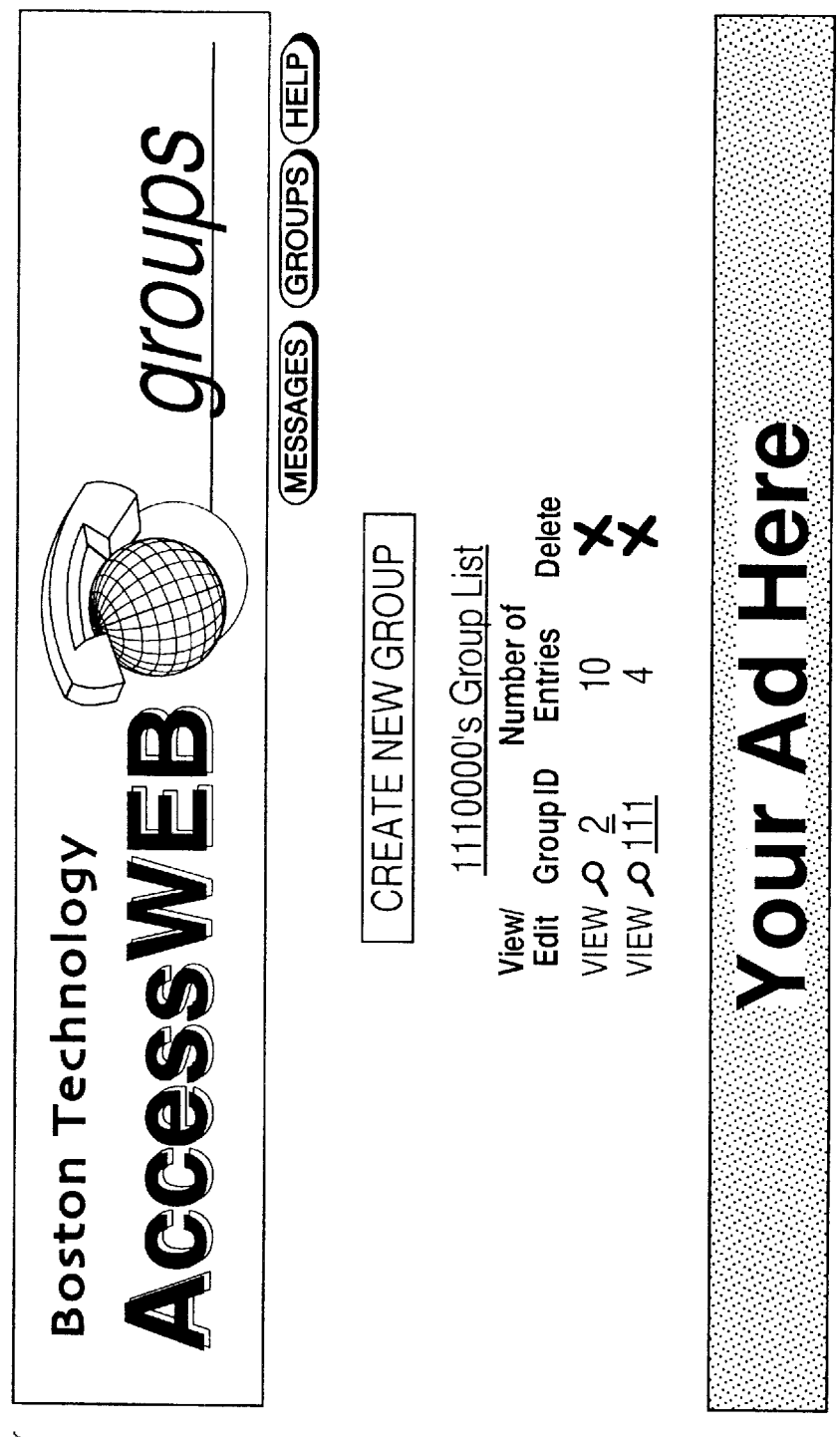

The group list administration functions can be facilitated using an active page such as depicted in FIG. 9 where custom distribution lists can be easily created and edited to add, delete and modify addresses of recipients of the various type of messages that are supported such as voice, video, facsimile, telex, e-mail, etc with addresses such as telephone numbers, e-mail addresses, universal resource location addresses, cable addresses, etc.

Figure 10:
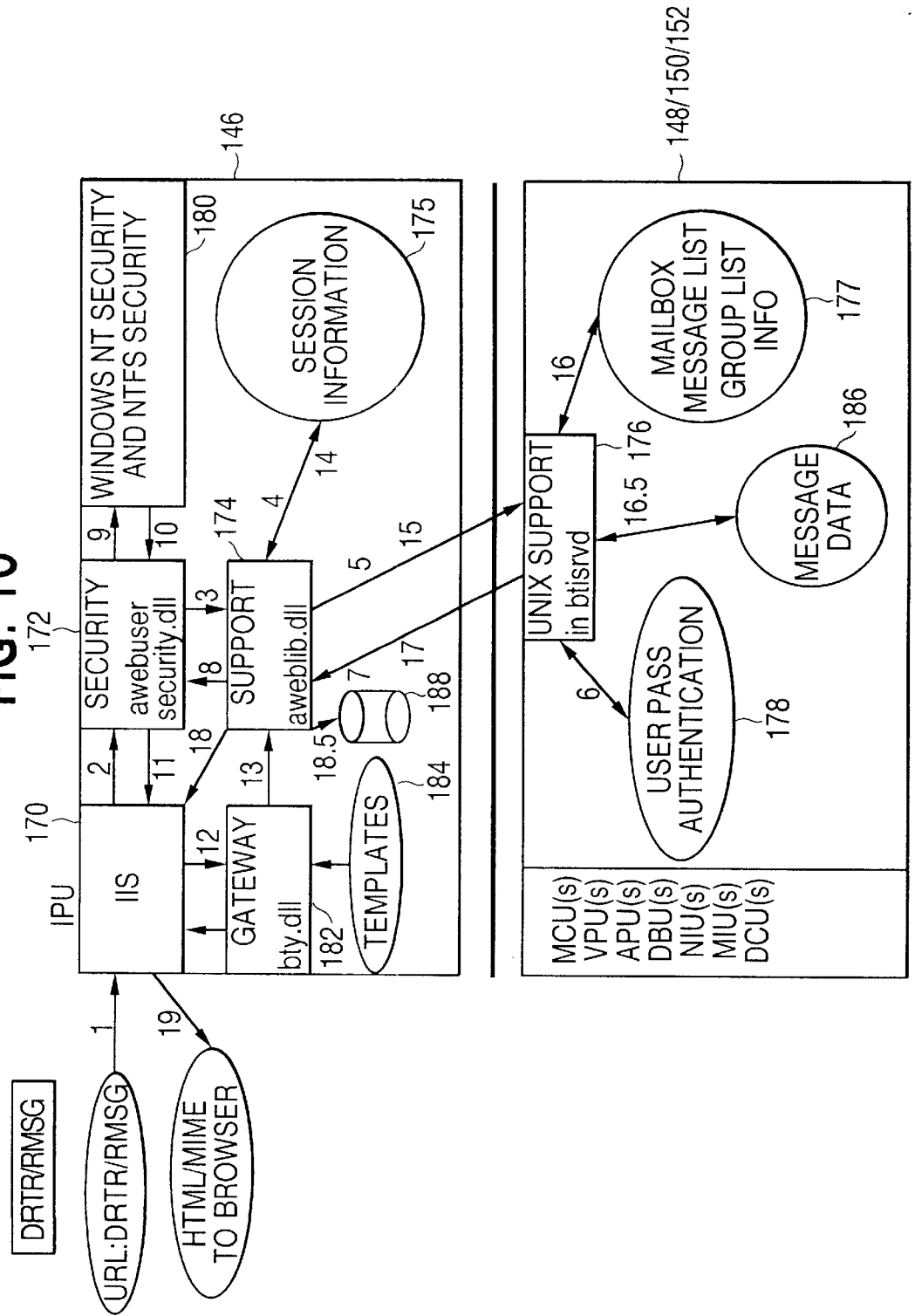
FIG. 10 illustrates the flow of control in a retrieval operation.

The processing of a message retrieve or play request (DRTR/RMSG), like the refresh request, starts with the transmission of a request 1 by the browser 144 to the unit 146 as depicted in FIG. 10. The request can be made by double clicking on a message in the list of FIG. 8. The request is processed in the same way as the refresh request for steps 2–10. In step 11 the name of the requested file which has been made using a coded name may also be converted to the real file name, which is a security issue which will be discussed in more detail later. The file request is passed 12 to the gateway routine 182. The routine 182 passes the request for the file to the support routine 174 which obtains 14 a unique identifier from the session information 175. The request is then provided 15 to the application processing unit 150. The processing unit 150 accesses 16 the list of messages 177 and obtains 16.5 the message data is 186 (voice, text, video, etc.) from storage. The message data passed to the support routine 174 and is converted from the native storage format (from Oki 24 when the message is a voice message) into and stored 18.5 in cache or temporary storage 188. The cache storage allows later requests for the same message to be processed without again decompressing the data. As the data is temporarily stored it is retrieved as needed to perform a real-time conversion into streaming mode data and into the desired format, such as TrueSpeech. This conversion will convert voice data into data compatible with Netscape type "plug-in" play back systems that include TrueSpeech, Voxware, Real Audio and WAV (which is standard for Windows 95/NT). If the data is text data it can be converted into a tiff file compatible with a conventional tiff viewer. A facsimile message is typically stored in a tiff file. If the data is video data it is converted into MediaPlayer data (an avi file) compatible with the MediaPlayer system available from Microsoft. The data can also be converted into JPEG or MPEG for still and motion video players available for conventional browsers. The real-time streamed data, which includes the content type, is sent 18 to the IIS routine 170 and immediately forwarded 19 on to the browser 144 with an option to store the data in the cache local to the unit 146. When streamed the browser 144 does not know the content type of the message until the message is received from the server 146 and the invention relies on the default mode of the plug-in that handles the data type. At the browser 144 the transmitted data, if it is Voxware data, causes a window to open and it is immediately played or displayed as the case may be. Other types of data such as RealAudio require that a play button in a pop-up window be activated.

Once a message is received the subscriber, using the browser 144, can save it locally, play it again, reverse it, skip forward and backward, copy it into other files and other types of operations that can be performed with multimedia files.

During a record process, a media player, delivered with a conventional operating system such as windows 95/NT, records the message or the subscriber activates a plug-in of the browser 144 to record the message (voice, video, text, etc.). Using the application, the subscriber edits, rerecords, etc. the message until satisfied. When finished the user provides a file name to the recording and stores it locally. The browser 144 is then used to POST the message to the server. Alternatively, the browser 144 can be used to request that the server 146 record the message and send it. The server responds by performing the steps 1–21 for refreshing a page previously discussed and forwards a template for a page, such as depicted in FIG. 11. The subscriber completes the template by providing the file name of the recording, addresses (such as telephone numbers, e-mail addresses, etc.) of the recipient along with indicators for privacy, etc. The browser 144 when the "submit message" button is pressed creates a message header, attaches the file and sends the file to the server 146. The server 146, when the file appears in the incoming message directory, converts the message into an appropriate storage format (compresses it if necessary) and stores the message. The header is reviewed to ascertain the recipient addresses and the message is retrieved and sent to the recipients. For example, a voice message to a particular telephone number would result in an outdial process being performed. If the recipient is a subscriber the message is copied to the recipients mailbox.

The present invention enhances the security of each session with a number of different features.

Unit 126 is preferably limited to the HTTP (Hypertext Transfer Protocol) and SSL (Secure Sockets Layer) type Internet service to help eliminate problems associated with unsecure protocols. The present invention also has certain authentication features. A request is first sent from the browser 144 to the server 146 that does not include authentication. The Microsoft Internet Information Server (IIS-170) software running in the server 146 checks this request. The filter 170 also checks to see if the user is valid and since there is no authentication the check fails and the browser 144 sends the request again this time with authentication. The request either passes or fails based on the authentication. When the request fails the browser 144 is notified. When the request passes the request is forwarded for processing. In an initial log-in situation the request is forwarded to the users home APU 150 where the validity of the user is checked again to determine whether the user is a subscriber. This double validation helps prevent nonsubscribers from obtaining access to the system. When the user is a subscriber the user gets a message list sent to the browser 144 where it is displayed. Once a session is established the user is essentially communicating with the home APU 150 for this subscriber which controls further transactions. All further requests by the browser 144 to the server 146 go through the first level of authentication.

The system preferably uses secure socket layer (SSL) packet encryption.

The present invention also is preferably implemented using dual homed-host Internet processing units that prevents packet sniffing on the internal ethernet. A dual homed-host is a host that has two IP addresses that correspond to one or more physical addresses allowing it to be configured differently based on the IP address. For example, one IP could be configured only to work with SSL active and the other IP is used in the clear, i.e. without SSL.

The provision of a router to perform packet filtering prevents source address spoofing.

The present invention also assigns session numbers and specifically created file names to files that are transferred to the browser 44. In this filter operation the process removes all correlation to any data set internal to the platform 132 from data sent over the network 136. For example, a message identifier that is sent to the browser includes a session identifier and a randomly assigned file identifier (which can be the current time of day). The server 146 creates a session information entry that identifies the file for the session identifier and the randomly assigned file identifier. When the browser 144 requests the file the session identifier and previously assigned file identifier are included with the request. The server 146 uses the session information to convert the file name into a real file name to retrieve the file. When the server 146 sends the requested file to the browser 144 the server 146, if it is not a streamed data file, the server 146 assigns a pseudo file name that includes a session number and a randomly created file name. This pseudo file name and the real file name are also stored in the session information so that the file can be requested again. The session number is part of the create identifier to allow communications that use the same random number to be distinguished. If the file is a streamed data file, the data of the file with content type is sent without any file name identification.

The present invention preferably uses a buffer of 8192 bytes to improve transfer efficiency even though a buffer size of from 512 bytes to 8192, except for 4096 for certain audio formats when the data is audio, will work.

The present invention, through the network interface provides two methods of message deletion: immediate or marking messages to be deleted with a deletion "Commit" (see FIG. 8) at the end of a session. The second option is like the deletion feature of the audio (telephone) interface where messages to be deleted can be listened to again thereby removing the delete flag and only those messages flagged for deletion are deleted when the audio session is ended.

The present invention also allows different types of messages to be bundled together into a multimedia type message with multiple body parts. The state information for a message includes body part information which indicates the content type of the body part.

The present invention is also suitable for providing electronic data interchange (EDI) services where EDI forms, such as purchase order forms, are provided to a user for the purchase of goods, etc. Other types of data such as weather data can also be stored and transmitted.

The present invention, using the administration features, can be configured through the network interface to perform operations such as sending standard text or voice messages to doctor's patients.

The administration of mailbox features, such as the password, telephone ring count, etc., is performed using HTML templates that can be customized for each service provider.

The present invention provides priority of access to a mailbox by one of the owners to accesses that are made through the telephone interface.

The browser 144, if it automatically requests a refresh of a currently displayed page, allows a page to be created that includes a message list icon that can be updated to reflect that a new message has arrived during the session.

The present invention also includes an automatic log-off feature that will log a subscriber out of the system when there has been no activity for a period of time. This allows subscribers to inadvertently leave their PC logged in to the system, such as when going home from work, and prevent others from accessing the system during the absence.

The administration features of the system allows a verified system administrator to access a system administration home page showing variables such as alarms, number of users logged in, etc., and to perform functions such as releasing an access block on a subscriber mailbox.

The present invention has been described with respect to handling text messages such as e-mail and facsimile. The text messages could have other formats such as a word processing format, a spread sheet format, a database format, etc. and could be other MIME type information that can be retrieved without conversion. The applications that are performed by the application processing units could include personal information managers, appointments, address books, etc.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A message storage system, comprising:

a single multimedia mailbox for each subscriber storing voice messages and text messages intermingled;

a voice interface providing access to the messages via a telephone; and a network interface providing access to the messages over a network via a personal computer with message identifiers of the messages including a session number and a randomly assigned identifier and the message identifiers assigned to a file name sent to a browser.

2. A message storage and retrieval system, comprising:

a telephone;

a telephone network coupled to said telephone;

a computer including a digital network browser;

a digital network coupled to the computer; and a distributed architecture message system coupled to said telephone network and said digital network, said message system comprising:

a digital switch coupled to said telephone network;

a control unit storing addresses of multimedia messages of a single mailbox for each subscriber including voice, text, and video messages, and controlling switching of said digital switch;

a processing unit coupled to said digital switch, storing and retrieving the multimedia messages, and outputting the voice and text messages to said telephone as audio over said telephone network responsive to telephone commands;

a local network coupled to said control unit and said processing unit; and a network unit coupled to the digital network and said local network including a data conversion cache, providing a home page with a message list including message identifiers comprising a session number and a randomly assigned file identifier responsive to a home page request by the browser, retrieving the messages from the processing unit and streaming the messages to the computer responsive to browser message play requests to the home page having an expired expiration date, the computer playing an audio of the voice messages in real-time as the voice messages are received, displaying an image of the text messages in real-time as the video messages are received, and displaying images of video messages in real-time as the video messages are received, and said computer recording a message and forwarding a message to said network unit for storage in said processing unit.

* * * * *